Sept. 16, 1941.  J. CUSTER  2,256,018
HYDRAULIC CLUTCH
Filed Sept. 25, 1939
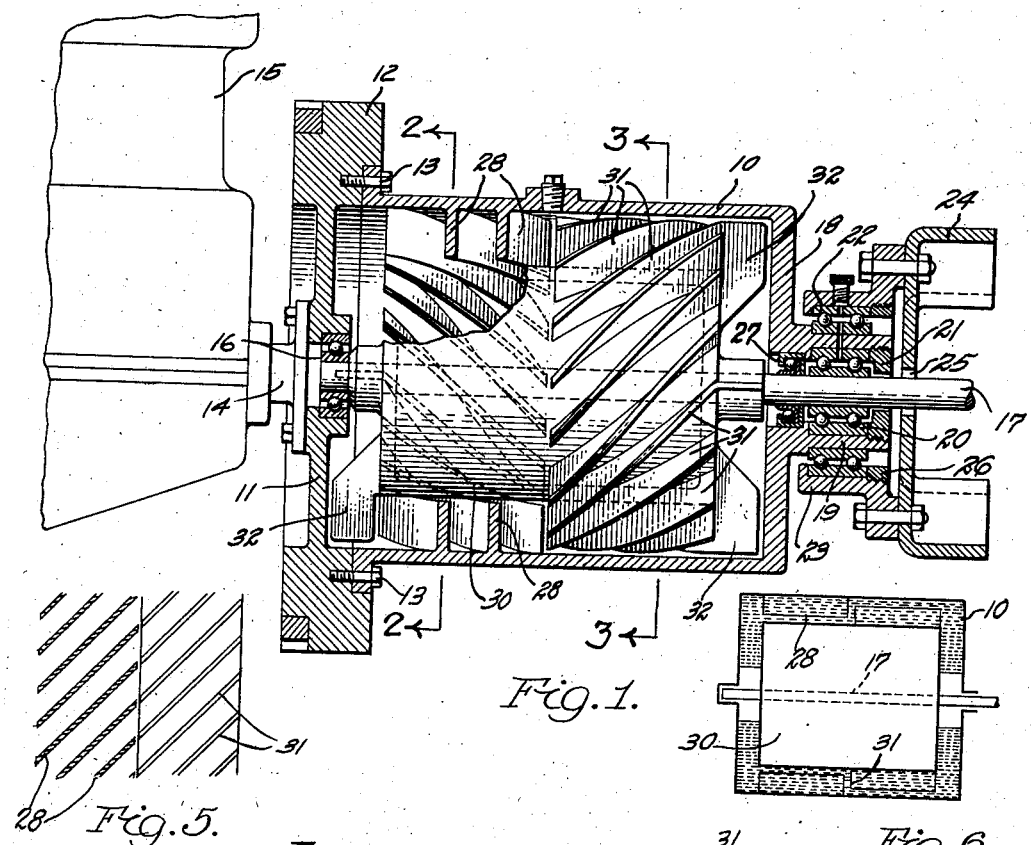
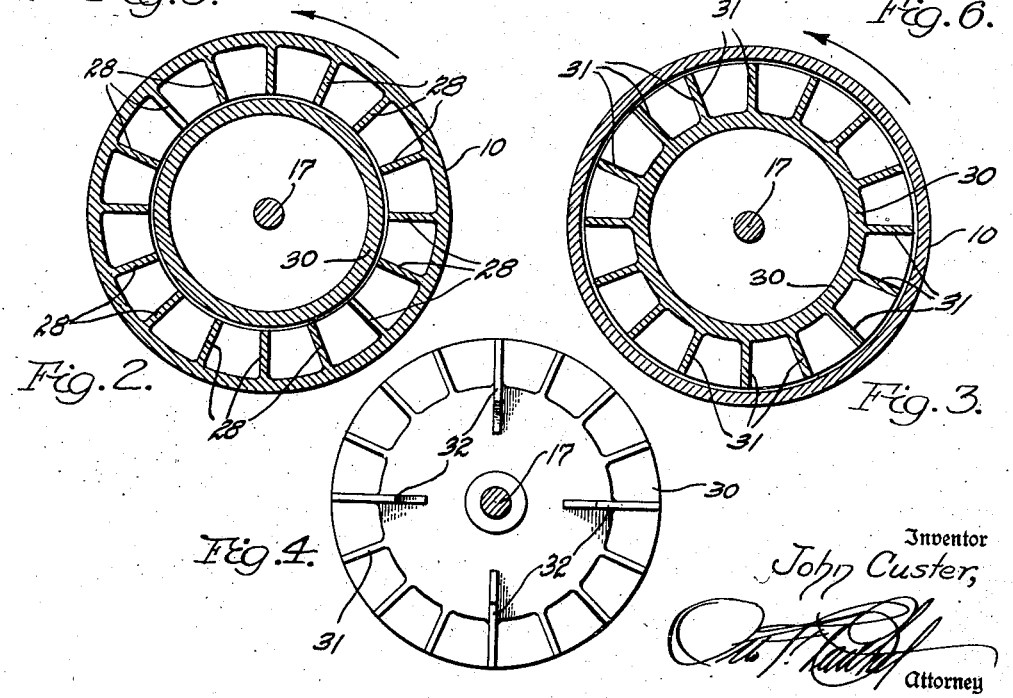
Inventor
John Custer,
Attorney Patented Sept. 16, 1941

2,256,018

UNITED STATES PATENT OFFICE 2,256,018

HYDRAULIC CLUTCH

John Custer, Detroit, Mich.

Application September 25, 1939, Serial No. 296,438

5 Claims. (Cl. 192—58)

This invention relates generally to clutches and more particularly to hydraulic clutches.

It is an object of the present invention to provide a new and improved clutch for connecting an engine to a load preferably without need of gear transmissions and without damage to the clutch or to the engine.

Another object of the invention is to provide a new and improved hydraulic clutch of the character in which liquid acted on by centrifugal force serves as the holding medium between two relatively movable clutch members.

Another object of the invention is to provide a new and improved hydraulic clutch which is simple in construction and inexpensive to manufacture.

Other objects of the invention will become apparent from the following detailed description taken in connection with the accompanying drawing in which—

Figure 1 is a view shown in central longitudinal section of the hydraulic clutch and shown associated with an engine;

Fig. 2 is a view shown in cross section of the clutch, taken along the line and in the direction of the arrows 2—2 of Fig. 1;

Fig. 3 is a sectional view similar to Fig. 2 and taken along the line and in the direction of the arrows 3—3 of Fig. 1;

Fig. 4 is an end elevational view of one of the clutch members of the hydraulic clutch;

Figs. 5 and 6 are diagrammatical views shown to aid in the description of operation of the hydraulic clutch.

Referring to the drawing by characters of reference, the present hydraulic clutch includes an outer hollow casing or drum 10, one end wall 11 of which is formed by a flywheel 12 to which the drum 10 may be rigidly secured by bolts 13 or if desired the drum and flywheel may be cast integral. The wall 11 of the flywheel is provided with a central hub to which a coupling 14 may be provided and secured for rigidly securing the flywheel to the drive shaft of an engine 15. Within the flywheel hub there is preferably provided a bearing 16 in which is journaled, one end of a driven shaft 17, the shaft 17 extending centrally through the drum coaxially therewith and projecting externally of the drum through the end wall 18 opposite the flywheel. Preferably the end wall 18 is provided with an external hub or hollow boss 19 through which the shaft 17 extends and mounted within the boss 19, a bearing 20 is preferably provided for the shaft 17, the outer race of the bearing 20 being held against outward end thrust movement by a nut 21 screwthreaded into the outer end of the hollow boss 19. The hollow boss 19 is journaled in a bearing 22 which is mounted in a bearing container 23 which surrounds the boss 19 in spaced relation thereto, the container 23 being rigidly secured to a support 24 having a clearance aperture 25 for the shaft 17. The outer race of the bearing 22 may be held against an internal shoulder of the bearing container 23 by a nut 26 screwthreaded into the container to prevent end thrust movement of the bearing. Also within the hollow boss 19, a liquid sealing bearing 27 is preferably provided for preventing flow of liquid outwardly along the shaft 17. A quantity of liquid, preferably a liquid of high density is provided in the drum and this liquid, as will later be seen, serves as a medium to utilize centrifugal force to obtain a clutching action.

One end portion of the drum 10 and, in this instance, the end adjacent the flywheel 12 is provided with a plurality of internal blades 28, spaced equally around the inner periphery of the drum, the blades 28 being arranged at an angle and all blades being arranged at the same angle with respect to the axis of the drum. Extending toward the flywheel, the blade ends terminate preferably in a plane spaced from and substantially parallel to the drum end wall 11. The other or opposite ends of the blades 28 terminate in a plane parallel to and intermediate the drum end walls and thus only a part of the drum is provided with blades. Secured on the shaft within the outer drum is an inner drum 30 having its opposite ends spaced from the outer drum end walls, the end of the drum 30, disposed toward the flywheel, preferably lying in the plane of termination of the adjacent ends of the blades 28, as shown in Fig. 1.

The inner drum 30 is provided around its periphery with a plurality of spaced, external blades 31 which are angularly disposed relative to the axis of the drum 30 and are arranged at the same angle as the angle of the blades 28 of the outer drum. In the present construction with the outer drum having one end portion provided with internal blades and the inner drum having an end portion provided with external blades, the inner and outer drums might be said to be complementary. The blades on the two drums are arranged such that their inner opposed edges are in close proximity, as shown in the drawing. On the ends of the inner drum 30 are provided additional blades 32 which are radially disposed extending toward and in close proximity to the opposite ends of the outer drum. On starting of the clutching action these radially disposed blades serve to immediately throw the liquid outwardly to obtain quickly the centrifugal force necessary to operate the clutch, the angularly disposed blades 31 of the inner drum also acting to throw the liquid outwardly.

In operation, a high centrifugal force is obtained by rotation of the outer drum by the engine and the liquid between the blades of the two drums is opposed with the result that the inner drum is rotated. Of course, upon starting there is some slippage between the two drums which is desirable, but at high speeds, the centrifugal force crowding the liquid in opposed directions along aligned passage between the blades will couple the clutch members together.

While I have shown and described my invention in detail it is to be understood that the same is to be limited only by the appended claims for many changes may be made without departing from the spirit and scope of the invention.

What I claim is:

1. In a hydraulic clutch for coupling an engine to a load, a rotatable outer drum containing a quantity of liquid, said drum having a plurality of spaced internal blades around the periphery thereof, an inner rotatable drum within said outer drum and having a plurality of external blades spaced around its periphery, said internal blades extending substantially to the outer periphery of said inner drum and said external blades extending substantially to the inner periphery of said outer drum and overlapping said internal blades.

2. A hydraulic clutch for coupling an engine to a load comprising an outer rotatable container having therein a quantity of liquid, said container having a plurality of internal spirally arranged blades spaced around the inner periphery thereof, a rotatable member within said container and having its opposite ends spaced from the container, and a plurality of radially spaced blades on opposite ends of said member and separate from said first-named blades.

3. In a clutch for coupling a driven member to a drive member, a rotatable drum operatively connected to one of the members and adjacent one end thereof having a plurality of internal blades, a quantity of fluid in said drum, a rotor within said drum and operatively connected to the other of the members, said rotor having the periphery of an end portion thereof opposed to the inner edges of said blades, and a plurality of spaced external blades on said rotor and positioned laterally with respect to the internal blades on said drum.

4. In a clutch for coupling a driven member to a drive member, a rotatable drum for connection with one of the members, said drum having a plurality of internal blades spaced about the inner periphery thereof, said blades extending longitudinally of said drum and terminating intermediate the ends thereof, a quantity of fluid in said drum, a rotor within said drum and connected to the other of the members, and a plurality of external longitudinally extending blades on said rotor and laterally positioned with respect to the blades on said drum.

5. In a fluid clutch for coupling a driven member to a driving member, a rotatable drum for connection to one of the members, a plurality of spaced internal spiral blades carried by said drum, said blades having ends thereof terminating intermediate the ends of the drum, a rotor within said drum and connected to the other of the members, a plurality of spaced external spiral blades carried by said rotor and positioned laterally with respect to the internal blades of said drum, said second-named blades having ends thereof terminating intermediate the ends of said rotor and opposed to said terminal ends of said first named blades, and fluid in said drum and acted upon by said blades to establish a driving connection between said drum and said rotor.

JOHN CUSTER.